(12) United States Patent
Kishima et al.

(10) Patent No.: US 9,561,548 B2
(45) Date of Patent: Feb. 7, 2017

(54) ELECTRIC TOOL

(71) Applicant: HITACHI KOKI CO., LTD., Tokyo (JP)

(72) Inventors: Yuji Kishima, Ibaraki (JP); Takeshi Takeda, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 0 days.

(21) Appl. No.: 15/075,518

(22) Filed: Mar. 21, 2016

(65) Prior Publication Data

US 2016/0199972 A1    Jul. 14, 2016

Related U.S. Application Data

(63) Continuation of application No. 13/525,025, filed on Jun. 15, 2012, now Pat. No. 9,289,832.

(30) Foreign Application Priority Data

Jun. 16, 2011   (JP) ................. 2011-134066

(51) Int. Cl.
*B25F 5/02* (2006.01)
*B23B 45/02* (2006.01)
*B25B 21/00* (2006.01)
*B25B 23/18* (2006.01)
*B25F 5/00* (2006.01)

(52) U.S. Cl.
CPC .............. *B23B 45/02* (2013.01); *B25B 21/00* (2013.01); *B25B 23/18* (2013.01); *B25F 5/001* (2013.01); *B25F 5/008* (2013.01); *B25F 5/02* (2013.01); *B23B 2260/024* (2013.01)

(58) Field of Classification Search
CPC ............ B23B 45/02; B25F 5/02; B25F 5/001; B25F 5/008; B25B 23/18; B25B 21/00
USPC ............................................................ 310/50
See application file for complete search history.

(56) References Cited

U.S. PATENT DOCUMENTS 4,751,452 A     6/1988   Kilmer et al.
6,127,751 A     10/2000  Kristen et al.
6,639,335 B1 *  10/2003  Lauk ....................... H02K 5/10
                                                310/83

(Continued)

FOREIGN PATENT DOCUMENTS

CN    101594969 A    12/2009
CN    101885178 A    11/2010

(Continued)

OTHER PUBLICATIONS

Chinese Office Action for the related Chinese Patent Application No. 201210203339.2 dated Aug. 28, 2014.

(Continued)

*Primary Examiner* — Naishadh Desai
(74) *Attorney, Agent, or Firm* — Kenealy Vaidya LLP

(57) ABSTRACT

An electric tool including: a motor; a housing including, a motor housing accommodating the motor, and a handle housing having one end connected to the motor housing and another other end configured to be provided with a detachable battery pack; an output part partially accommodated in the motor housing and configured to be driven by the motor; and a control board accommodated in the motor housing and configured to control the motor.

18 Claims, 7 Drawing Sheets

(56) References Cited

U.S. PATENT DOCUMENTS

| | | | | |
|---|---|---|---|---|
| 2006/0255756 A1* | 11/2006 | Iwata | ...................... | B25F 5/008 318/400.41 |
| 2007/0221392 A1 | 9/2007 | Britz et al. | | |
| 2008/0265695 A1* | 10/2008 | Yoshida | ................... | H02K 5/20 310/50 |
| 2008/0309172 A1* | 12/2008 | Tseng | ........................ | B25F 5/02 310/50 |
| 2010/0175902 A1 | 7/2010 | Rejman et al. | | |
| 2010/0253162 A1 | 10/2010 | Sakamaki et al. | | |
| 2010/0283332 A1* | 11/2010 | Toukairin | ................ | B25F 5/008 310/50 |
| 2012/0191250 A1 | 7/2012 | Iwata et al. | | |

FOREIGN PATENT DOCUMENTS

| | | |
|---|---|---|
| CN | 102092032 A | 6/2011 |
| JP | 1-175185 U | 12/1989 |
| JP | 11-221779 A | 8/1999 |
| JP | 2000-84868 A | 3/2000 |
| JP | 2003-199310 A | 7/2003 |
| JP | 2003-209960 A | 7/2003 |
| JP | 2004-9284 A | 1/2004 |
| JP | 2006-340555 A | 12/2006 |
| JP | 2007-21620 A | 2/2007 |
| JP | 2009-196013 A | 9/2009 |
| JP | 2010-23197 A | 2/2010 |
| JP | 2010-42455 A | 2/2010 |
| JP | 4487836 B2 | 6/2010 |
| JP | 2011-16210 A | 1/2011 |

OTHER PUBLICATIONS

Japanese Office Action for the related Japanese Patent Application No. 2011-134066 dated Jan. 22, 2015.
manual of GSR10,8 V-LI-2.
Press Release of Bosch.
Japanese Office Action for the related Japanese Patent Application No. 2015-116169 dated Jun. 30, 2016.

* cited by examiner

REAR ←——→ FRONT

ELECTRIC TOOL

CROSS-REFERENCE TO RELATED APPLICATIONS

This application claims priority under 35 U.S.C. 120 and is a Continuation of U.S. patent application Ser. No. 13/525,025 filed on Jun. 15, 2012 which in turn claims priority under 35 U.S.C. 119 from Japanese Patent Application No. 2011-134066 filed on Jun. 16, 2011, the entire contents of which are incorporated herein by reference.

TECHNICAL FIELD

Aspects of the present invention relates to an electric, and more particularly, to a driver drill.

BACKGROUND

A related-art driver drill as an example of an electric tool includes a housing, a motor accommodated in the housing, a power transmission mechanism driven by the motor, a circuit board including a switching element for driving the motor, and a control board for controlling the energization of the switching element (for example, see Japanese Patent No. 4487836). The control board is accommodated in the housing to be located in a side opposite to the power transmission mechanism relative to the motor.

The housing mainly includes a motor housing accommodating a motor and a handle housing configured to be grasped by an operator. The control board is accommodated in the handle housing.

SUMMARY

However, in the related-art driver drill, since the circuit board is accommodated in the housing to be located in a side opposite to the power transmission mechanism relative to the motor, there is a problem that the length of the motor housing accommodating the motor in a longitudinal direction becomes long and thus the size of the driver drill becomes large.

Further, since the control board is arranged at a position spaced apart from the motor, a wiring structure connecting the control board and the motor becomes complex in the housing and thus the workability during assembly is poor.

Accordingly, an object of the present invention is to provide an electric tool capable of improving the workability during assembling and realizing compactness.

According to an aspect of the invention, there is provided an electric tool including: a motor; a housing including, a motor housing accommodating the motor, and a handle housing having one end connected to the motor housing and another other end configured to be provided with a detachable battery pack; an output part partially accommodated in the motor housing and configured to be driven by the motor; and a control board accommodated in the motor housing and configured to control the motor.

According to another aspect of the invention, there is provided an electric tool including: a brushless motor; a housing including, a motor housing accommodating the brushless motor, and a handle housing having one end connected to the motor housing and another end configured to be provided with a detachable battery pack; a power transmission part accommodated in the motor housing and configured to be driven by the brushless motor; an output part partially accommodated in the motor housing and configured to be driven by the power transmission part; and a circuit board arranged between the brushless motor and the power transmission part and including a switching element which is arranged around the power transmission part and is configured to control energization of the brushless motor.

According to another aspect of the invention, there is provided an electric tool including: a housing including, a motor housing extending in a front-rear direction, and a handle housing extending downward from the motor housing; a battery pack fixed to a lower portion of the handle housing; a motor accommodated in the motor housing; an output part configured to be driven by power from the motor and protruding from a front portion of the motor housing; and a control board arranged in the motor housing and configured to control the motor.

According to another aspect of the invention, there is provided an electric tool including: a housing including, a motor housing extending in a front-rear direction, and a handle housing extending downward from the motor housing; a battery pack fixed to a lower portion of the handle housing; a motor accommodated in the motor housing; a power transmission part accommodated in the motor housing and configured to be driven by the power from the motor; an output shaft protruding from a front portion of the motor housing and configured to be driven by the power transmission part; and a switching element arranged on an outer periphery of the power transmission part and configured to energize the motor.

According to another aspect of the invention, there is provided an electric tool including: a housing including, a motor housing extending in a front-rear direction, and a handle housing extending downward from the motor housing; a battery pack fixed to a lower portion of the handle housing; a brushless motor accommodated in the motor housing; an output part configured to be driven by the power from the brushless motor and protruding from a front portion of the motor housing; and a circuit board arranged in front of the brushless motor and including a switching element protruding from a front surface thereof.

DETAILED DESCRIPTION

Figure 1:
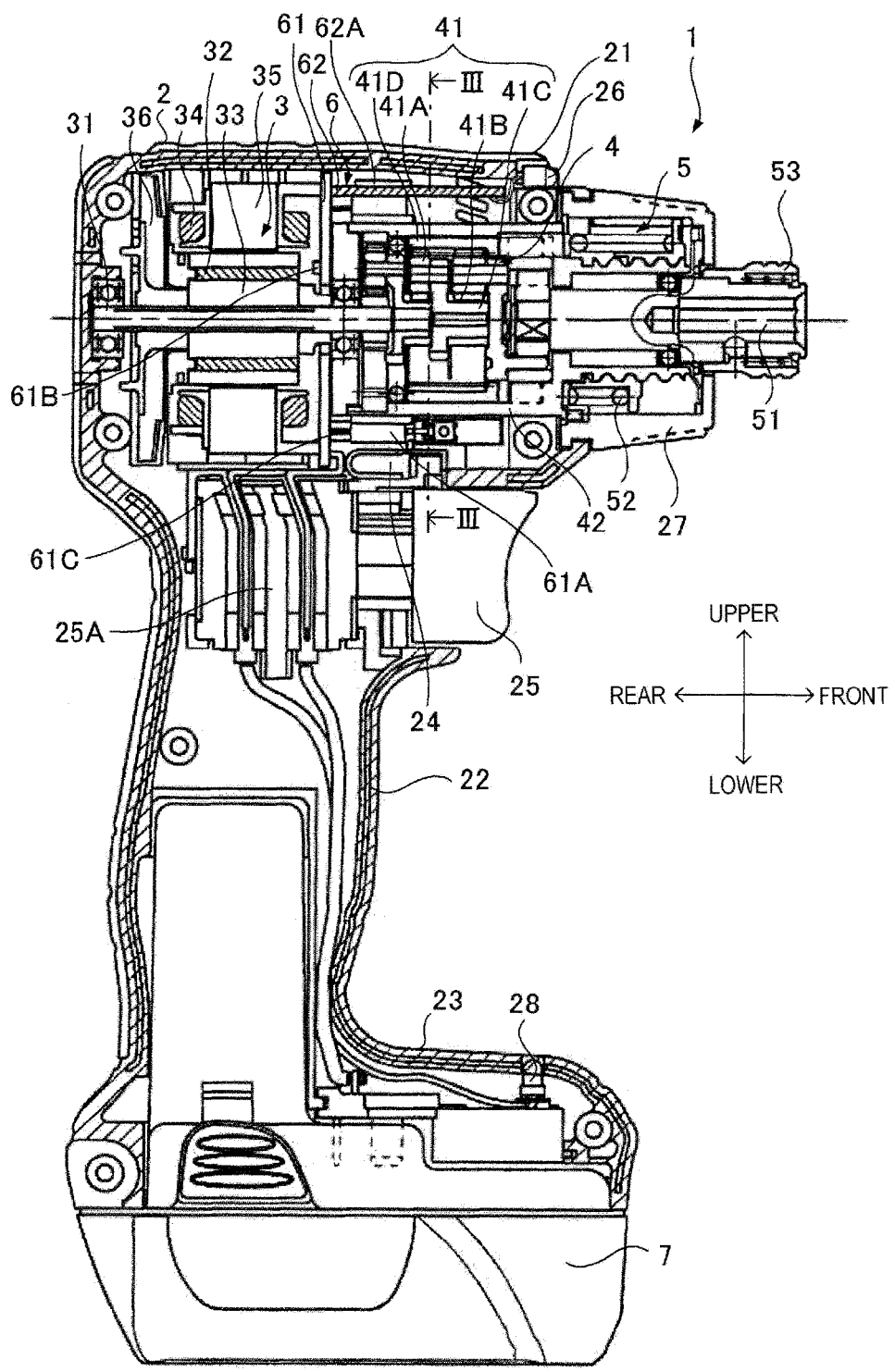
FIG. 1 is a cross-sectional view illustrating a driver drill according to a first exemplary embodiment of the present invention.

An electric tool according to a first exemplary embodiment of the present invention will be described by referring to FIGS. 1 to 5. A driver drill 1 is employed as an example of the electric tool. The driver drill 1 includes a housing 2, a brushless motor 3, a power transmission part 4, an output part 5, a control part 6 and a battery 7.

As illustrated in FIG. 1, the housing 2 includes a motor housing 21 accommodating the brushless motor 3 and the power transmission part 4, a handle housing 22 extending from the motor housing 21 and a battery housing 23 partially accommodating the battery 7. Hereinafter, an extension direction of the handle housing 22 extending from the motor housing 21 is defined as a downward direction and an opposite direction thereof is defined as an upward direction. A position of the output part 5 relative to the brushless motor 3 is defined as a front direction and an opposite direction thereof is defined as a rear direction. Further, a direction orthogonal to the up-down direction and the front-rear direction is defined as a right-left direction.

Figure 2:
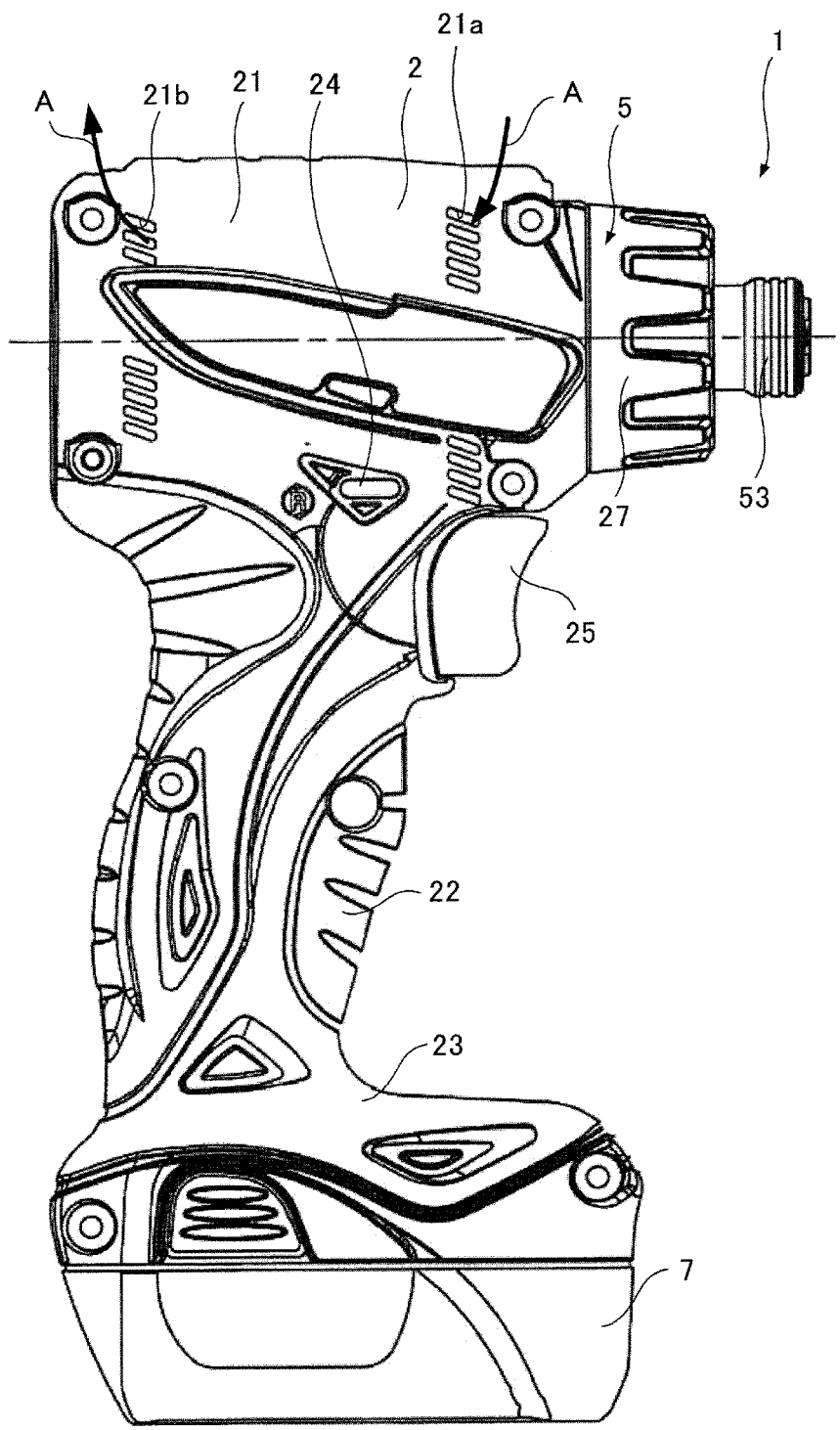
FIG. 2 is an external view illustrating the driver drill according to the first exemplary embodiment of the present invention.

As illustrated in FIG. 2, the motor housing 21 is formed with a plurality of inlets 21a for introducing the outside air and a plurality of outlets 21b for discharging the outside air. A rotational direction switch 24 for switching a rotational direction of the brushless motor 3 is provided near the inlets 21a. As illustrated in FIG. 1, a light 26 capable of irradiating a surrounding of a bit (not-illustrated) is provided to an upper portion of the motor housing 21. The bit is mounted to the output part 5. A torque adjustment part 27 is provided at a front side of the motor housing 21 and can rotate relative to the motor housing 21.

A trigger 25 is provided to the base portion of the handle housing 22 to turn on/off the power supply to the brushless motor 3. The trigger 25 is connected to a trigger switch 25A which is provided in the handle housing 22. The handle housing 22 partially accommodates the battery 7.

The handle housing 22 is connected to the battery housing 23 to which the battery 7 is detachably attached. The battery housing 23 is provided with a pilot lamp 28 for representing an operation state of the driver drill 1.

The brushless motor 3 includes an output shaft 31, a rotor 33 rotating coaxially-integrally with the output shaft 31 and having a plurality of permanent magnets 32, a stator 35 provided around the rotor 33 and having a plurality of coils 34 and a cooling fan 36 fixed to the output shaft 31. The output shaft 31 extends in the front-rear direction and is rotatably supported by the motor housing 21. The cooling fan 36 is provided at a rear portion of the brushless motor 3. A circuit board 61 (will be described later) is provided at a front portion of the brushless motor 3.

The power transmission part 4 includes a planetary gear mechanism 41 and a gear case 42 accommodating the planetary gear mechanism 41. The planetary gear mechanism 41 is a three-stage planetary gear mechanism. The planetary gear mechanism 41 includes a planetary gear 41A, a carrier 41C having a sun gear 41B meshed with the planetary gear 41A, and a ring gear 41D meshed with the planetary gear 41A. Output of the output shaft 31 is transmitted to the planetary gear 41A and the planetary gear 41A revolves around the sun gear 41B while being meshed with the ring gear 41D. Rotation due to this revolution is transmitted to the carrier 41C in next state. Rotation of the brushless motor 3 is decelerated in such a way and transmitted to a spindle 51 which will be described later.

Figure 3:
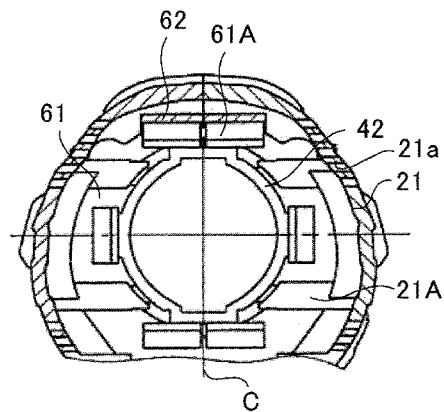
FIG. 3 is a cross-sectional view taken along a line III-III of FIG. 1, illustrating the driver drill according to the first exemplary embodiment of the present invention.

The gear case 42 is formed in an approximately cylindrical shape and made of metal. Further, the gear case 42 is supported by the motor housing 21 and rotatably supports the ring gear 41D. More specifically, the gear case 42 is supported by a plurality of support members 21A which are provided to the motor housing 21, as illustrated in FIG. 3. A switching element 61A which will be described later is arranged around the gear case 42.

The output part 5 essentially includes the spindle 51, a torque adjustment spring 52 and a bit holding part 53. The spindle 51 extends in the front-rear direction and a bit (not-illustrated) can be inserted into a tip of the spindle and engaged with a fastening member. The torque adjustment spring 52 is arranged around the spindle 51 and presses against the ring gear 41D. The pressing force of the torque adjustment spring 52 to the ring gear 41D can be adjusted by rotating the torque adjustment part 27. Operator can rotate the torque adjustment part 27 to change an output torque. The torque adjustment part 27 and the torque adjustment spring 52 serve as a so-called clutch mechanism and are configured so that the spindle 51 stops rotating when the load applied to the spindle 51 exceeds a predetermined value.

Specifically, when the torque load applied to the spindle 51 is small, the torque adjustment spring 52 presses against the ring gear 411) and the ring gear 41D is in a non-rotatable state. Accordingly; the planetary gear 41A revolves around the sun gear 413. This revolution is transmitted to the spindle 51 via the carrier 41C and thus the spindle 51 is rotated. When the torque load applied on the spindle 51 becomes larger to exceed a predetermined value, the ring gear 41D starts to rotate by the pressing force of the torque adjustment spring 52 and the planetary gear 41A performs only rotation. Thereby, the carrier 41C does not rotate and the spindle 51 stops rotating. As such, the torque adjustment part 27 is configured to adjust the output torque by changing the pressing force of the torque adjustment spring 52 to the ring gear 41D.

The bit holding part 53 is provided on the tip of the spindle 51 and prevents the bit from falling down from the spindle Si by urging the bit (not-illustrated) with a ball.

The control part 6 includes a circuit board 61 and a control board 62. The circuit board 61 includes six switching elements 61 for controlling the energization of the brushless motor and a hall element 61B to for detecting the position of the rotor 33. The circuit board 61 is arranged between the brushless motor 3 and the power transmission part 4 (gear case 42) and extends in the up-down direction. The circuit board 61 is formed with a plurality of vent holes (not-illustrated) which penetrate the circuit board in the front-rear direction. Cooling wind introduced through the inlets 21a passes the plurality of vent holes.

Figure 4:
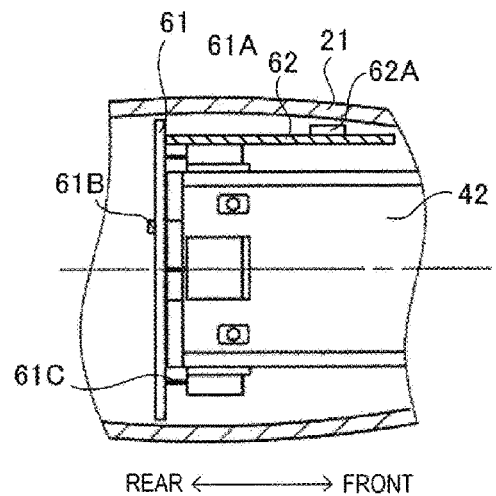
FIG. 4 is a view illustrating a positional relationship among a gear case, a circuit board and a control board of the driver drill according to the first exemplary embodiment of the present invention.
Figure 5:
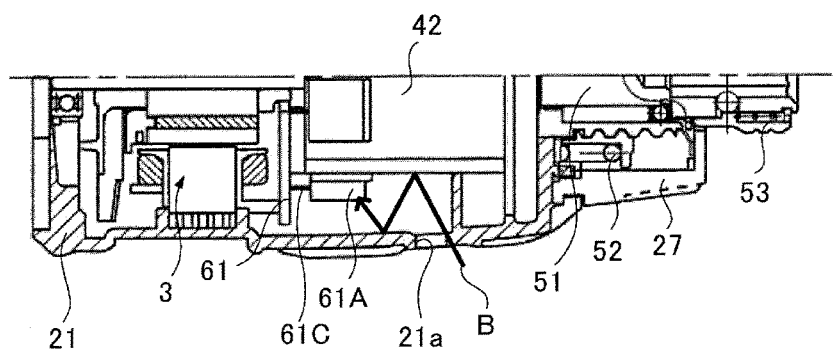
FIG. 5 is a view for explaining the flow of wind around a gear case of the driver drill according to the first exemplary embodiment of the present invention.

The switching element 61A is formed in an approximately rectangular shape and is placed at a side (power transmission part 4 (gear case 42) side) opposite to the brushless motor 3 relative to the circuit board 61 and a longitudinal direction thereof is parallel to the front-rear direction. As illustrated in FIG. 3, the six switching elements 61 are arranged around the gear case 42 having an approximately circular cross-section and also in an axially symmetric manner relative to a plane C perpendicular to the front-rear direction. The position of the switching element overlaps in the front-rear direction with the gear case 42 (FIG. 4). Hereinafter, the description "overlap in the front-rear direction" means that the switching element 61A and the gear case 42 are positioned on a cross-section which is perpendicular to the front-rear direction and includes the switching element 61A. A support part 61C extends rearward from the switching element 61A and the switching element 61A is fixed and electrically connected to the circuit board 61 by the support part 61C. The surface of each switching element 61A opposing the gear case 42 is in contact with the gear case 42. Thereby, the gear case 42 serves as a cooling fin and thus the cooling efficiency of the switching element 61A can be improved.

The control board 62 is arranged in the motor housing 21 to extend in the front-rear direction and includes a microcomputer 62A for controlling the energization of the switching element 61A. A rear end of the control board 62 is connected to an upper portion of the circuit board 61 and a front end thereof is supported by the motor housing 21 by a rib which is not-illustrated. As illustrated in FIG. 3, a lower surface of the control board 62 contacts with an upper surface of two switching elements 61A which are arranged at an upper portion of the gear case 42. The control board 62 is electrically connected to the light 26 and the trigger switch 25A.

The battery 7 is a so-called insertion type and is partially accommodated in the handle housing 22. The battery 7 is detachably mounted to the battery housing 23 and includes a battery cell therein.

Next, an operation of the driver drill 1 will be described. As an operator pulls the trigger 25, the pilot lamp 28 turns on, the brushless motor 3 is rotationally driven and the cooling fan 36 is rotated. At this time, the air introduced through the inlet 21*a* (arrow A in FIG. 2) cools the gear case 42 and then cools the switching elements 61A, as indicated by arrow B in FIG. 5. Thereafter, the air passes through the vent hole (not-illustrated) formed to the circuit board 61 to cool the circuit board 61. And then, the air cools the brushless motor 3 and then is discharged through the outlet 21*b* (arrow A in FIG. 2). Simultaneously, the driving force of the brushless motor 3 is transmitted to the output part 5 via the power transmission part 4 and thus a fastening member is fastened to a workpiece (as an object to be processed) by the bit which is not-illustrated. When the torque reaches a torque set by the torque adjustment part 27, the spindle 51 stops rotating. As the operator releases the trigger 25, the brushless motor 3 is stopped and the pilot lamp 28 turns off.

According to the above-described configuration, the control board 62 is accommodated in the motor housing 21 and thus the control board 62 can be located near the brushless motor 3. Thereby, it is possible to simplify the wiring structure inside the driver drill 1 and the workability during assembling can be improved. In related-art, the control board 62 is arranged in the handle housing 22. However, according to the present exemplary embodiment, since an empty space is generated inside the handle housing 22 by mounting the control board 62 in the motor housing 21, the insertion type battery pack of a large size can be mounted in the space.

Further, according to the above-described configuration, since the switching element 61A is arranged around the power transmission part 4 and the circuit board 61 is arranged between the brushless motor 3 and the power transmission part 4, the switching element 61A overlaps with the power transmission part 4 in the front-rear direction. Thereby, the length of the motor housing 21 in the front-rear direction can be shortened and thus it is possible to realize compactness of the driver drill 1.

Further, according to the above-described configuration, since the switching element 61A contacts with the metal gear case 42, it is possible to improve the cooling efficiency of the switching element 61A.

Further, according to the above-described configuration, since the inlet 21*a* is formed near the control board 62, it is possible to improve the cooling efficiency of the control board 62.

Further, according to the above-described configuration, since the switching element 61A is arranged around the gear case 42 and also in an axially symmetric manner, heat is uniformly transmitted to the gear case 42 and thus it is possible to increase the radiation effect of the switching element 61A.

Figure 6:
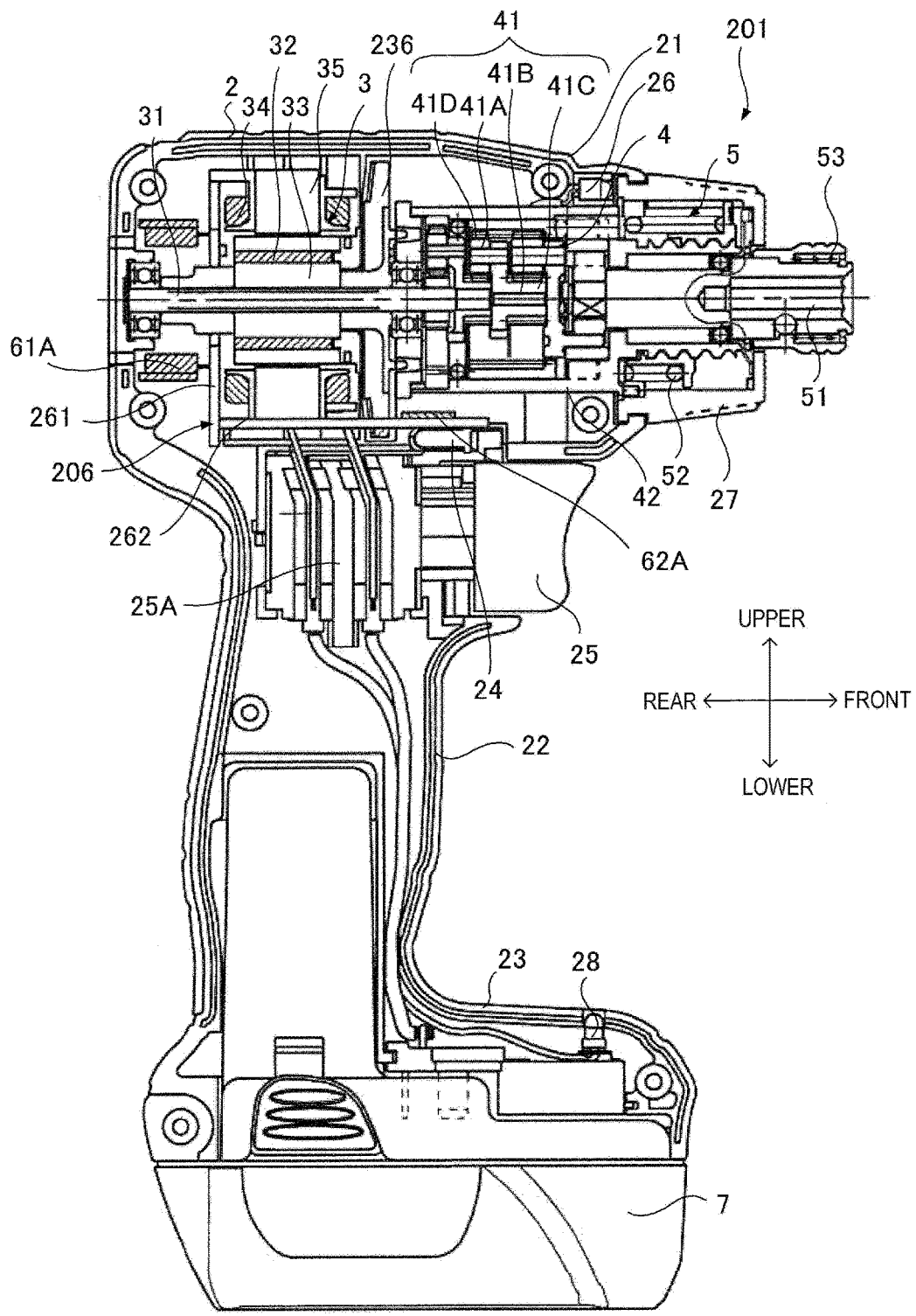
FIG. 6 is a cross-sectional view illustrating a driver drill according to a second exemplary embodiment of the present invention.

Next, a driver drill 201 according to a second exemplary embodiment of the present invention will be described by referring to FIG. 6. The same or similar element will be denoted by the same reference numeral as that of the first exemplary embodiment and duplicated explanation thereof will be omitted.

A control part 206 includes a circuit board 261 and a control board 262. The circuit board 261 is arranged at a rear side of the brushless motor 3 inside the motor housing 21. The switching element 61A is placed in a side opposite to the brushless motor 3 relative to the circuit board 261 and a longitudinal direction thereof is parallel to the front-rear direction. The control board 262 is arranged immediately above the trigger switch 25A inside the motor housing 21. A rear end of the control board 262 is connected to a lower portion of the circuit board 261 and a front end thereof is supported by the motor housing 21 by a rib which is not-illustrated. A cooling fan 236 is arranged between the brushless motor 3 and the power transmission part 4.

According to the above-described configuration, the control board 262 is accommodated in the motor housing 21 and thus the control board 262 can be located near the brushless motor 3. Thereby, it is possible to further simplify the wiring structure inside the driver drill 201 and the workability during assembling can be improved.

Further, according to the above-described configuration, since the control board 262 is arranged near the trigger switch 25A, it is possible to further simplify the wiring structure inside the driver drill 201.

Figure 7:
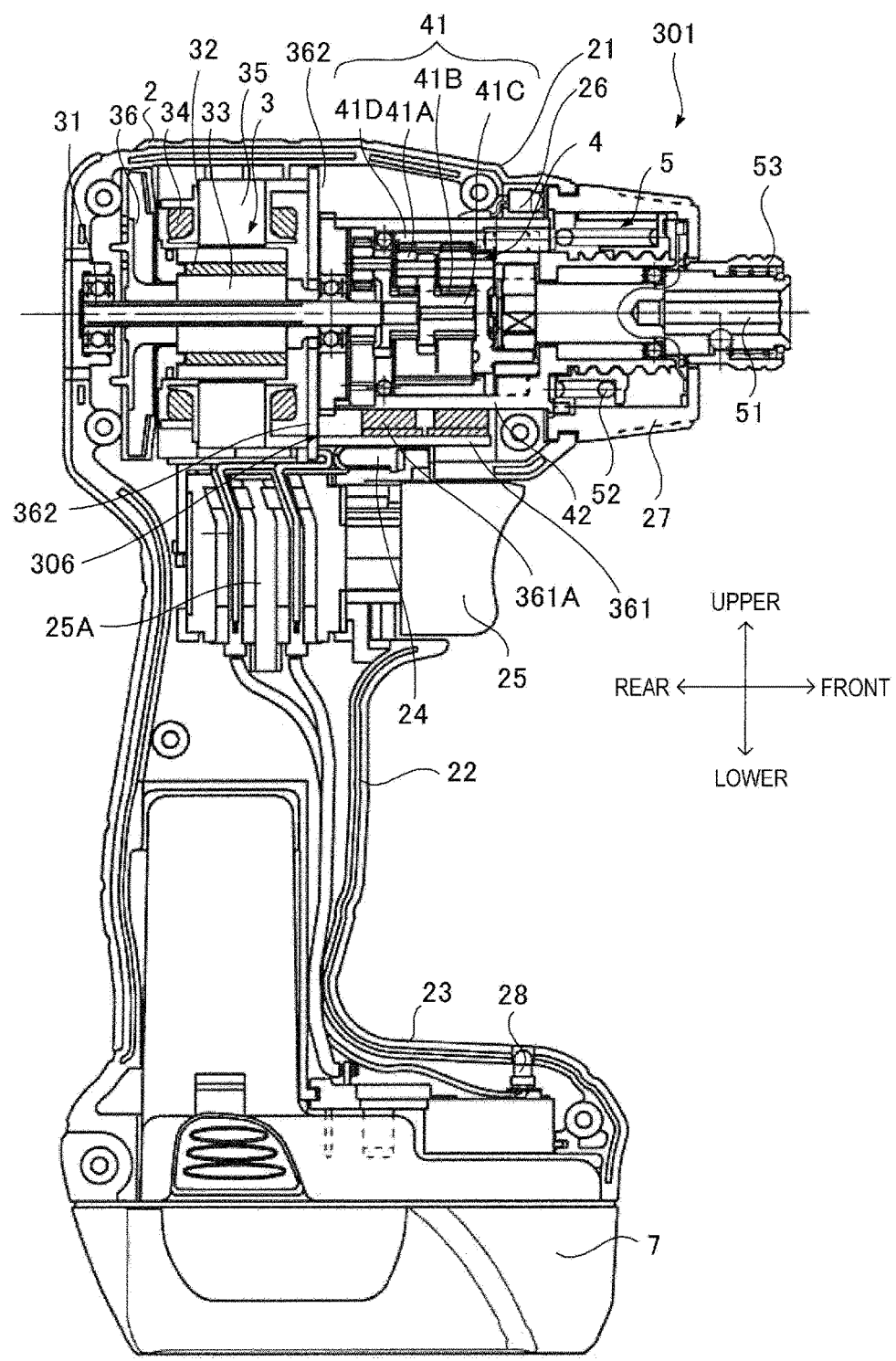
FIG. 7 is a cross-sectional view illustrating a driver drill according to a third exemplary embodiment of the present invention.
Figure 8:
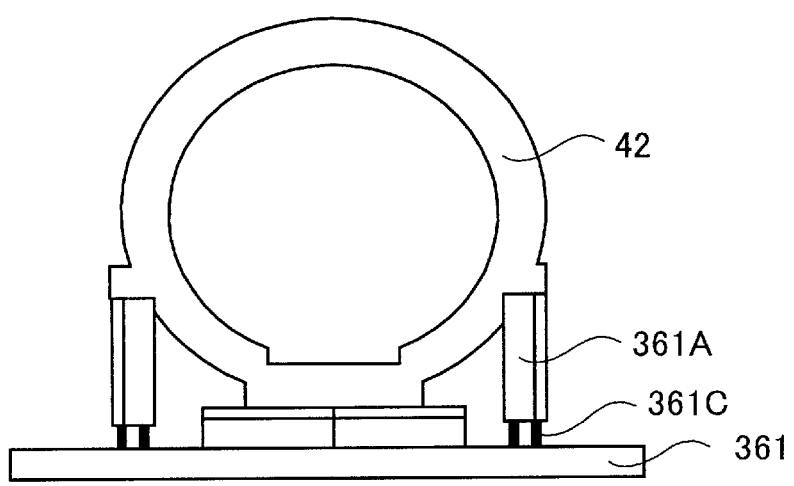
FIG. 8 is a view illustrating a positional relationship between a switching element and a gear case of the driver drill according to the third exemplary embodiment of the present invention.

Next, a driver drill 301 according to a third exemplary embodiment of the present invention will be described by referring to FIGS. 7 and 8. The same or similar element will be denoted by the same reference numeral as that of the first exemplary embodiment and duplicated explanation thereof will be omitted.

A control part 306 includes a circuit board 361 and a control board 362. The circuit board 361 is arranged in front of the brushless motor 3 and also immediately below the planetary gear mechanism 41 to extend in the front-rear direction. The circuit board 361 includes six switching elements 361A. Four out of six switching elements 361A are arranged on the circuit board 361 so that a longitudinal direction thereof is parallel to the front-rear direction. At this time, one long side of a cross-section of each of the switching elements 361A perpendicular to the left-right direction is connected to the gear case 42 and the other long side thereof is connected to the circuit board 361. As illustrated in FIG. 8, the remaining two switching elements 361A are arranged on the circuit board 361 so that a longitudinal direction thereof is parallel to the up-down direction. At this time, one short side of a cross-section of each of the two switching elements 361A perpendicular to the left-right direction is connected to the gear case 42. As illustrated in FIG. 7, a rear end of the circuit board 361 is connected to a lower portion of the control board 362 and a front end thereof supported by the motor housing 21 by a rib which is not-illustrated. The control board 362 is arranged between the brushless motor 3 and the power transmission part 4 inside the motor housing 21 to extend in the up-down direction.

According to the above-described configuration, the control board 362 is accommodated in the motor housing 21 and thus the control board 362 can be located near the brushless motor 3. Thereby, it is possible to further simplify the wiring structure inside the driver drill 301 and the workability during assembling can be improved.

Further, according to the above-described configuration, since the switching element 361A is arranged around the power transmission part 4 and the circuit board 361 is arranged between the brushless motor 3 and the power transmission part 4, the switching element 361A is overlapped with the power transmission part 4 in the front-rear direction. Thereby, the length of the motor housing 21 in the front-rear direction can be shortened and thus it is possible to realize compactness of the driver drill 301.

Further, according to the above-described configuration, since the switching element 361A contacts with the metal gear case 42, it is possible to improve the cooling efficiency of the switching element 361A.

Further, according to the above-described configuration, since the control board 362 is arranged near the trigger switch 25A and the brushless motor 3, it is possible to further simplify the wiring structure inside the driver drill 301.

Figure 9:
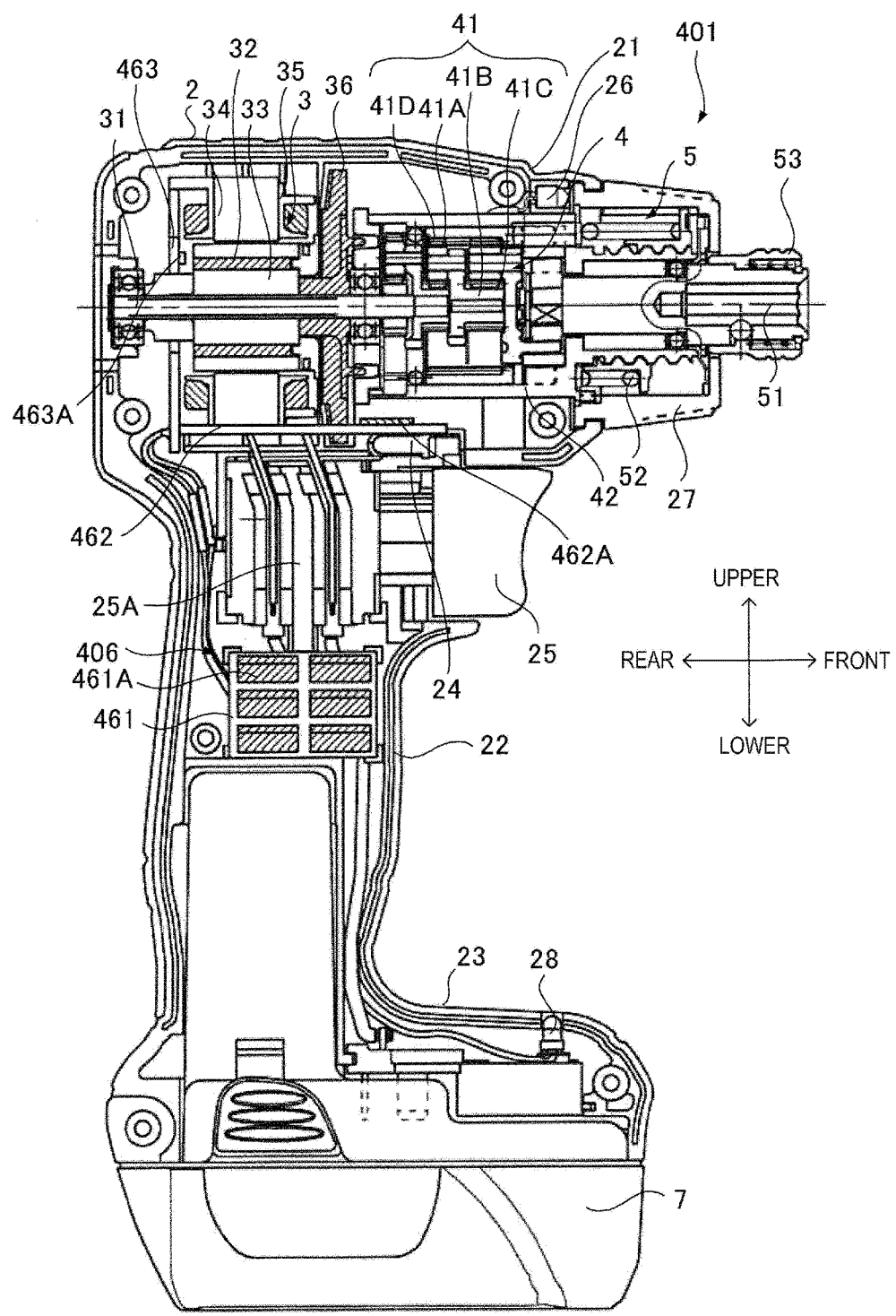
FIG. 9 is a cross-sectional view illustrating a driver drill according to a fourth exemplary embodiment of the present invention.

Next, a driver drill 401 according to a fourth exemplary embodiment of the present invention will be described by referring to FIG. 9. The same or similar element will be denoted by the same reference numeral as that of the first exemplary embodiment and duplicated explanation thereof will be omitted.

A control part 406 includes a first circuit board 461, a second circuit board 463 and a control board 462. The first circuit board 461 and the second circuit board 463 correspond to the circuit board 61 of the first exemplary embodiment. The first circuit board 461 and the second circuit board 463 are electrically connected to each other. The first circuit board 461 is arranged inside the handle housing and also immediately below the trigger switch 25A. The first circuit board 461 is supported by a plurality of ribs provided to the handle housing 22 and includes six switching elements 461A. Each switching elements 461A is arranged on the first circuit board 461 so that a longitudinal direction thereof is parallel to the front-rear direction. At this time, one long side of a cross-section perpendicular to the up-down direction is connected to the control board 462. The second circuit board 463 includes a hall element 463A.

The control board 462 includes a microcomputer 462A. The control board 462 is arranged immediately above the trigger switch 25A inside the motor housing 21. A rear end of the control board 462 is connected to a lower portion of the second circuit board 463 and a front end thereof is supported by the motor housing 21 by a rib which is not-illustrated.

According to the above-described configuration, the control board 462 is accommodated in the motor housing 21 and thus the control board 462 can be located near the brushless motor 3. Thereby, it is possible to further simplify the wiring structure inside the driver drill 401 and the operating efficiency during assembling can improved.

Further, according to the above-described configuration, since the first circuit board 461 with the switching element 461A is arranged inside the handle housing 22 and the second circuit board 463 with no switching element is arranged in a rear side of the brushless motor 3, the length of the motor housing 21 in the front-rear direction can be shortened and thus it is possible to realize compactness of the driver drill 401.

The driver drill 1 according to the present invention is not limited to the above exemplary embodiments, but may be variously changed within the scope of the gist of the present invention described in the claims. For example, although the driver drill 1 has been used as an example of an electric tool in the above exemplary embodiment, any other electric tool may be used as long as the brushless motor is mounted therein.

Although a planetary gear mechanism has been used as the power transmission part 4 in the above exemplary embodiment, the present invention is not limited to such a configuration. Further, it is not necessarily to include a deceleration mechanism.

The arranging position of the control board 62 is not limited to the position of the above exemplary embodiments, but the control board may be arranged at any position inside the motor housing 21. By arranging the control board inside a housing accommodating a motor, the control board is arranged near the motor and thus the same effect as can be obtained.

What is claimed is:

1. An electric tool comprising:
   a motor including an output shaft and a stator disposed around the output shaft, the output shaft extending in a front-rear direction;
   a housing including,
      a motor housing accommodating the motor, and
      a handle housing extending downwardly from the motor housing;
   a first board accommodated in the motor housing;
   a trigger disposed at a base portion of the handle housing, the trigger being configured to turn on/off power supply to the motor; and
   a rotational direction switch configured to switch a rotational direction of the motor,
   wherein the first board is disposed below the motor in an up-down direction perpendicular to the front-rear direction and extends in front of the rotational direction switch in the front-rear direction, and
   wherein the rotational direction switch is disposed in front of the stator in the front-rear direction and is disposed at a region defined between the first board and the trigger in the up-down direction.

2. The electric tool according to claim 1 comprising a planetary gear mechanism disposed in front of the motor in the front-rear direction,
   wherein the first board extends in front of the planetary gear mechanism in the front-rear direction.

3. The electric tool according to claim 1 comprising:
   an output part configured to be driven by the motor and to hold a tool; and
   a light configured to irradiate a surrounding of the tool, wherein the light is electrically connected to the first board and is disposed in front of the motor.

4. The electric tool according to claim 1 further comprising switching elements configured to control energization of the motor, wherein the first board is configured to control the switching elements to control the energization of the motor.

5. The electric tool according to claim 1 further comprising:
a cooling fan fixed to the output shaft;
a power transmitter disposed in front of the motor; and
a second board accommodated in the motor housing in such a manner that a plane of the second board crosses the output shaft,
wherein the cooling fan, the motor, the second board and the power transmitter are arranged in this order from a rear of the motor housing to a front of the motor housing in the front-rear direction.

6. The electric tool according to claim 1 further comprising a second board accommodated in the motor housing in such a manner that a plane of the second board crosses the output shaft.

7. The electric tool according to claim 5, wherein the second board has a hole through which the output shaft passes.

8. An electric tool comprising:
a motor including an output shaft and a stator disposed around the output shaft, the output shaft extending in a front-rear direction;
a housing including,
a motor housing accommodating the motor, and
a handle housing extending downwardly from the motor housing;
a first board accommodated in the motor housing;
a planetary gear mechanism disposed in front of the motor in the front-rear direction;
a trigger disposed at a base portion of the handle housing, the trigger being configured to turn on/off power supply to the motor; and
a rotational direction switch configured to switch a rotational direction of the motor,
wherein the first board is accommodated in the motor housing in such a manner that the first board is disposed below the output shaft in an up-down direction perpendicular to the front-rear direction and extends in front of the planetary gear mechanism in the front-rear direction, and
wherein the rotational direction switch is disposed in front of the stator in the front-rear direction and is disposed at a region defined between the first board and the trigger in the up-down direction.

9. The electric tool according to claim 8, wherein the first board extends in front of the rotational direction switch in the front-rear direction.

10. The electric tool according to claim 8 further comprising:
an output part configured to be driven by the motor and to hold a tool; and
a light configured to irradiate a surrounding of the tool, wherein the light is electrically connected to the first board and is disposed in front of the motor.

11. The electric tool according to claim 8 further comprising:
a cooling fan fixed to the output shaft; and
a second board accommodated in the motor housing in such a manner that a plane of the second board crosses the output shaft,
wherein the cooling fan, the motor, the second board and the planetary gear mechanism are arranged in this order from a rear of the motor housing to a front of the motor housing in the front-rear direction.

12. The electric tool according to claim 11, wherein the second board has a hole through which the output shaft passes.

13. The electric tool according to claim 8 further comprising a second board accommodated in the motor housing in such a manner that a plane of the second board crosses the output shaft.

14. An electric tool comprising:
a motor including an output shaft and a stator disposed around the output shaft, the output shaft extending in a front-rear direction;
a cooling fan fixed to the output shaft;
a housing including,
a motor housing accommodating the motor and the cooling fan, and
a handle housing extending downwardly from the motor housing;
a trigger disposed at a base portion of the handle housing, the trigger being configured to turn on/off power supply to the motor; and
a rotational direction switch configured to switch a rotational direction of the motor,
a controller including a first board and a second board; and
wherein the first board is accommodated in the motor housing in such a manner that the first board extends in front of the rotational direction switch in the front-rear direction,
wherein the second board is accommodated in the motor housing in such a manner that a plane of the second board crosses the output shaft, and
wherein the rotational direction switch is disposed in front of the stator in the front-rear direction and is disposed at a region defined between the first board and the trigger in the up-down direction.

15. The electric tool according to claim 14, wherein the cooling fan, the motor, the second board and the power transmitter are arranged in this order from a rear of the motor housing to a front of the motor housing in the front-rear direction.

16. The electric tool according to claim 14 comprising a planetary gear mechanism disposed in front of the motor in the front-rear direction,
wherein the first board extends in front of the planetary gear mechanism in the front-rear direction.

17. The electric tool according to claim 14 further comprising:
an output part configured to be driven by the motor and to hold a tool; and
a light configured to irradiate a surrounding of the tool, wherein the light is electrically connected to the first board and is disposed in front of the motor.

18. The electric tool according to claim 14, wherein the second board has a hole through which the output shaft passes.

* * * * *